United States Patent Office 3,629,306
Patented Dec. 21, 1971

3,629,306
PROCESS FOR THE PREPARATION OF B-FORM MICROCRYSTALLINE CHLORAMPHENICOL PALMITATE
Shigeo Kawamura, Saitama, and Takayoshi Hirano, Shuichi Takamura and Masahiko Okazaki, Tokyo, Japan, assignors to Yamanouchi Pharmaceutical Co., Ltd., Tokyo, Japan
No Drawing. Filed July 24, 1969, Ser. No. 844,667
Claims priority, application Japan, July 24, 1968, 43/52,367
Int. Cl. C07c 103/40; A61k 21/00
U.S. Cl. 260—404.5                      8 Claims

ABSTRACT OF THE DISCLOSURE

Process for the preparation of B-form microcrystalline chloramphenicol palmitate which is easily absorbed from the intestinal tract and is suitable for making the palmitate suspension, characterized by adding chloramphenicol palmitate and an ionic surface active agent to water or an aqueous sugar solution, heating and stirring the mixture to form an emulsion, and then adding an inorganic salt to the emulsion.

---

The present invention relates to a process for the preparation of B-form microcrystalline chloramphenicol palmitate.

Chloramphenicol palmitate is free from bitter taste and hardly soluble in water. Therefore, it is suitable for making oral suspensions. The chloramphenicol palmitate administered orally is hydrolyzed in the intestinal tract into chloramphenicol which is absorbed therefrom.

Depending on the form and the size of the crystals, there are instances where the hydrolysis of chloramphenicol palmitate is incomplete and accordingly the absorption from the intestinal tract of chloramphenicol is not so well as to produce the effective blood level of chloramphenicol.

Three types of chloramphenicol palmitate are known, that is, two crystalline types: (i) A-form (or β-form) crystalline chloramphenicol palmitate which is obtained by cooling a chloramphenicol palmitate solution or molten chloramphenicol palmitate slowly and is thermodynamically stable and (ii) B-form (or α-form) crystalline chloramphenicol palmitate which is obtained by cooling a chloramphenicol palmitate solution or molten chloramphenicol palmitate rapidly and is thermodynamically unstable, and one amorphous type: (iii) amorphous chloramphenicol palmitate which is obtained by chilling (or cooling more rapidly than in the case of preparing B-form crystals) molten chloramphenical palmitate and is thermodynamically most unstable. (cf. FDA-Regulation, 21, (1) 205; Journal of the Pharmaceutical Society of Japan, 81, 755–767 (1961); Annual Report of Takamine Research Institute, 11, 84–88; and Japanese patent publn. No. Sho 35–5798 (although it is described in this patent specification that the invention relates to a process for the preparation of non-crystalline chloramphenicol palmitate, it has been found later that what is actually obtained according to said process is B-form crystalline chloramphenicol palmitate).

Among these three types of chloramphenicol palmitate, the thermodynamically stable A-form crystalline chloramphenicol palmitate has a poor solubility in water and moreover its disolution in water takes place very slowly. Accordingly, A-form crystalline chloramphenicol palmitate is hardly hydrolyzed in the intestinal tract, and this results in a poor absorption from the intestinal tract of chloramphenicol and its poor blood level. Even by grinding, the A-form crystalline chloramphenicol palmitate cannot be divided into crystals of less than ca. 5α fineness, on account of its physicochemical properties, and it is impossible to produce an improved blood level.

The amorphous chloramphenicol palmitate is thermodynamically too unstable to be used practically.

On the other hand, the B-form crystalline chloramphenicol palmitate which is thermodynamically unstable as compared with the A-form crystalline chloramphenicol palmitate has an excellent solubility in water and its dissolution in water takes place speedily. Therefore, B-form crystalline chloramphenicol palmitate is easily hydrolyzed in the intestinal tract, and this results in an excellent absorption from the intestinal tract of chloramphenicol and its excellent blood level. However, the B-form crystalline chloramphenicol palmitate hitherto obtained, such as one obtained according to the process described in the Japanese patent publn. No. Sho 35–5798 by dissolving chloramphenicol palmitate in a hydrophilic solvent under heating and then cooling the solution rapidly, is insufficient in its fineness, and so it is difficult to prepare a suspension direct from such B-form crystalline chloramphenicol palmitate. By grinding, it can be divided into crystals of about 2–3μ fineness, and a suspension can be prepared from the latter. However, the suspension thus obtained is not complete in that the crystals of such fineness are still not well hydrolyzed in the intestinal tract and accordingly cannot produce a satisfactory blood level of chloramphenicol.

Now, it has been found that extremely fine (less than or equal to 1μ) and uniform B-form crystals of chloramphenicol palmitate are obtained in a high yield by adding chloramphenicol palmitate and a liquid or solid ionic surface active agent from the group of higher sodium alkyl sulfates, higher sodium alkyl arylsulfonates, higher sodium alkyl sulfosuccinates and higher alkylammonium halides, in which the chloramphenicol palmitate is not dissolved even by heating, to water or preferably to an aqueous solution of a sugar from the group of cane sugar, grape sugar, fruit sugar and sorbitol, heating the resulting mixture to at least 85° C., stirring the hot mixture to form an emulsion, cooling the emulsion at 60° C. or room temperature, and adding an inorganic salt into the cooled emulsion. The size of the microcrystalline chloramphenicol palmitate of this invention was measured by observation with electron microscope, and the size of the crystals indicates maximum size (not average size) of the crystals observed with electron microscope.

If the emulsion obtained in the course of this process is merely cooled and any inorganic salt is not added thereto, the resulting B-form crystals are not so fine (3–5μ) and not free from the defects as explained above. According to the process of this invention, however, the action of the surface active agent is weakened or diluted by the inorganic salt added to the emulsion and as a result the extremely fine and uniform crystals precipitate. This was never expected from the prior art knowledge and should be highly evaluated in the art.

As examples of the ionic surface active agent used in the process of this invention, there can be mentioned higher sodium alkyl sulfates such as sodium lauryl sulfate and sodium palmityl sulfate, higher sodium alkyl arylsulfonates such as sodium dodecyl benzenesulfonate and sodium decyl naphthalenesulfonate, higher sodium alkyl sulfosuccinates such as sodium di-octyl sulfosuccinate, higher alkylammonium halide such as lauryl trimethylammonium chloride, and the like. The ionic surface active agent is preferably added in an amount of 25-100% by weight of chloramphenicol palmitate.

As examples of the sugar to be used as aqueous solution thereof, there can be mentioned cane sugar, grape sugar, fruit sugar and sorbitol. Sugar concentrations of the aqueous sugar solution used in this invention are 10% to 70% (w./v.), preferably 30% to 60% (w./v.).

Any physiologically non-toxic inorganic salt which does not affect chloramphenicol palmitate, such as sodium sodium chloride, sodium hexametaphosphate, magnesium sulfate, etc. can be used as the inorganic salt. These salts are preferably added in the form of an aqueous solution thereof.

In case the viscosity of the emulsion obtained is high, it is preferred to dilute the emulsion with water before the addition of the inorganic salt.

The precipitated crystals are collected by filtration and, if necessary, are washed with water, alcohol or the like. Then, they are dried.

Comparison of blood levels produced in dogs after the oral administration was effected under the substantially same test conditions, among (a) the B-form microcrystalline chloramphenicol palmitate prepared by the process of this invention, (b) the B-form crystalline chloramphenicol palmitate obtained by a conventional process and divided by mechanical grinding, and (c) chloramphenicol.

EXPERIMENTAL PROCEDURE

The drug to be tested was orally administered to an adult male dog weighing from 10 to 14 kg., in a single dose equivalent to 100 mg. chloramphenicol per kg. body weight. Blood specimens were taken at 1, 2, 4, 6 and 8 hours after the administration, and the sera were separated and analyzed for chloramphenicol by microbiological assays. Each test was carried out using six dogs as a group.

The results obtained are shown in the following Table 1:

TABLE 1

| Hours after dose | Blood level ($\gamma$/ml.) | | | | |
|---|---|---|---|---|---|
| | 1 | 2 | 4 | 6 | 8 |
| Drug tested: | | | | | |
| B-form microcrystalline chloramphenicol palmitate of this invention | 16.2 | 22.6 | 25.2 | 23.3 | 18.3 |
| Conventional B-form crystalline chloramphenicol palmitate after grinding | 9.0 | 16.9 | 19.1 | 20.0 | 14.7 |
| Chloramphenicol | 21.8 | 32.2 | 25.5 | 13.9 | 2.8 |

The blood levels ($\gamma$/ml.) given in the above table are mean values by "Cross over" method of six subjects.

As is apparent from the table, the blood levels produced by the B-form microcrystalline chloramphenicol palmitate of this invention are substantially equal to those produced by the use of chloramphenicol itself, and moreover they are rather superior in durability than the latter.

Although many reports have been hitherto presented with regard to the blood levels of chloramphenicol after the oral administration of B-form crystalline chloramphenicol palmitate, there are great differences among the date reported therein (cf. Antibiotics and Chemotherapy, 8, 510-527 (1958); Japanese patent publn. No. 35-5798), and so it is impossible to compare those data direct with one another. Generally speaking, the results of biomedical (human or animal) tests are greatly influenced by the conditions under which the experiments are carried out. For example, in animal tests using dogs, the results may vary depending on the strain and breeding circumstances of each subject, the dosage form of the drug, the measuring method employed, etc., and a slight difference in such test conditions may result in a great separation between those experimental data obtained which should essentially be equivalent to each other. This is particularly so in the biomedical tests using chloramphenicol palmitate. Therefore, the comparison of the blood levels produced by the administration of chloramphenicol palmitate must be effected only among those data obtained under strictly same experimental conditions.

The following examples are given to illustrate the present invention, but it is not limited within them.

Example 1

60 grams of chloramphenicol palmitate and 30 g. of sodium lauryl sulfate were added to 900 ml. of 40% aqueous cane sugar solution, and the mixture was heated at 85° C. or higher and stirred by homogenizer to form an emulsion. The emulsion was allowed to cool to room temperature, and 600 ml. of water were added to the cooled emulsion while stirring. Subsequently, 100 ml. of 10% a aqueous sodium chloride solution were added to the emulsion. Microcrystals of less than or equal to $0.5\mu$ fineness precipitated, after a while.

Example 2

20 grams of chloramphenicol palmitate and 12 g. of sodium dodecyl benzenesulfonate were added to 300 ml. of 30% aqueous cane sugar solution, and the mixture was heated at 85° C. or higher and stirred by homogenizer to form an emulsion. The emulsion was diluted by adding 200 ml. of water while stirring. Then, 100 ml. of 4% aqueous sodium chloride solution were added to the emulsion. Microcrystals of less than or equal to $1\mu$ fineness precipitated, after one night.

Example 3

20 grams of chloramphenicol palmitate, 10 g. of sodium di-octyl sulfosuccinate and 2 g. of polyvinyl pyrrolidone were added to 200 ml. of water, and the mixture was heated at 85° C. or higher and stirred by homogenizer to form an emulsion. The emulsion was allowed to cool gradually to room temperature, and 200 ml. of water were added to the cooled emulsion while stirring. Then, 100 ml. of 5% aqueous sodium chloride solution were added to the emulsion, and the whole was allowed to stand whereby microcrystals of less than or equal to $1\mu$ fineness precipitated.

Example 4

20 grams of chloramphenicol palmitate and 14 g. of lauryl trimethylammonium chloride were added to 200 ml. of 60% aqueous sorbitol solution, and the mixture was heated at 85° C. or higher and stirred by homogenizer to form an emulsion. The emulsion was allowed to cool gradually to room temperature, and 200 ml. of water was added to the cooled emulsion while stirring. Then, 100 ml. of 5% aqueous sodium chloride solution was added to the emulsion, and the whole was allowed to stand whereby microcrystals of less than or equal to $1\mu$ fineness precipitated.

What is claimed is:

1. Process for the preparation of B-form microcrystalline chloramphenicol palmitate, characterized by adding chloramphenicol palmitate and an ionic surface active agent selected from the group consisting of higher sodium alkyl sulfate, higher sodium alkyl arylsulfonate, higher sodium alkyl sulfosuccinate and higher alkyl ammonium halide to water or a 10% to 70% (w./v.) aqueous solution of a sugar selected from the group consisting of cane sugar, grape sugar, fruit sugar and sorbitol, heating the mixture to at least 85° C., stirring the hot mixture to form an emulsion, cooling the emulsion at 60° C. or room temperature, and adding a physiologically non-toxic inorganic salt to the cooled emulsion.

2. Process according to claim 1 in which the higher sodium alkyl sulfate is sodium lauryl sulfate.

3. Process according to claim 1 in which the higher sodium alkyl sulfate is sodium palmityl sulfate.

4. Process according to claim 1 in which the higher sodium alkyl arylsulfonate is sodium dodecyl benzenesulfonate.

5. Process according to claim 1 in which the higher sodium alkyl arylsulfonate is sodium decyl naphthalenesulfonate.

6. Process according to claim 1 in which the higher sodium alkyl sulfosuccinate is sodium di-octyl sulfosuccinate.

7. Process according to claim 1 in which the higher alkylammonium halide is lauryl trimethylammonium chloride.

8. Process according to claim 1 in which the inorganic salt is sodium chloride.

References Cited

UNITED STATES PATENTS 3,543,293   11/1970   Agaki et al. _____ 260—562

LEWIS GOTTS, Primary Examiner

D. G. RIVERS, Assistant Examiner

U.S. Cl. X.R.

424—312